(12) United States Patent
Bhirangi et al.

(10) Patent No.: US 12,520,757 B2
(45) Date of Patent: Jan. 13, 2026

(54) SPREADER FOR HARVESTED CROP RESIDUE

(71) Applicant: DEERE & COMPANY, Moline, IL (US)

(72) Inventors: Piyush Bhirangi, Amravati (IN); Dirk Schubert, Matzenbach (DE); Martin Rittershofer, Zweibrücken (DE)

(73) Assignee: DEERE & COMPANY, Moline, IL (US)

( * ) Notice: Subject to any disclaimer, the term of this patent is extended or adjusted under 35 U.S.C. 154(b) by 600 days.

(21) Appl. No.: 18/054,942

(22) Filed: Nov. 14, 2022

(65) Prior Publication Data

US 2023/0172104 A1     Jun. 8, 2023

(30) Foreign Application Priority Data

Dec. 2, 2021   (DE) .......................... 102021131802.5

(51) Int. Cl.
   *A01D 41/12*        (2006.01)
(52) U.S. Cl.
   CPC ................................. *A01D 41/1243* (2013.01)
(58) Field of Classification Search
   CPC ...... A01D 41/1243; A01D 41/12; A01F 12/40
   See application file for complete search history.

(56) References Cited

U.S. PATENT DOCUMENTS

| | | | |
|---|---|---|---|
| 7,331,855 B2 | 2/2008 | Johnson et al. | |
| 11,547,048 B2 * | 1/2023 | De Baere | A01D 41/1243 |
| 2003/0109293 A1 * | 6/2003 | Wolters | A01F 12/40 460/111 |
| 2008/0188275 A1 * | 8/2008 | Mayerle | A01D 41/1243 460/111 |
| 2009/0325659 A1 * | 12/2009 | Overschelde | A01D 41/1243 460/112 |
| 2019/0269071 A1 * | 9/2019 | Dilts | A01D 41/1243 |

FOREIGN PATENT DOCUMENTS

| | | |
|---|---|---|
| DE | 102008040129 A1 | 3/2009 |
| EP | 1442651 A2 | 8/2004 |
| EP | 2250868 A1 | 11/2010 |
| EP | 3613272 A1 | 2/2020 |
| EP | 3613273 A1 | 2/2020 |

* cited by examiner

*Primary Examiner* — Joseph M Rocca
*Assistant Examiner* — Jose Antonio Martinez

(57) ABSTRACT

A spreader for harvested crop residue is configured to be attached downstream of a straw chopper of a combine harvester and comprises two adjacently arranged throw blowers with paddles which are able to be set in rotation about one respective axis and in opposing directions to one another, as well as a guide arrangement for predetermining the spreading characteristic of the throw blowers, said guide arrangement having a front tip penetrating the interstice between the throw blowers and two lateral guide elements which follow downstream and which in each case are adjacent to a throw blower and are adapted to the contour thereof. Extension means are connectable or connected to the guide arrangement, for selectively extending the guide device in the axial direction of the throw blowers.

14 Claims, 3 Drawing Sheets

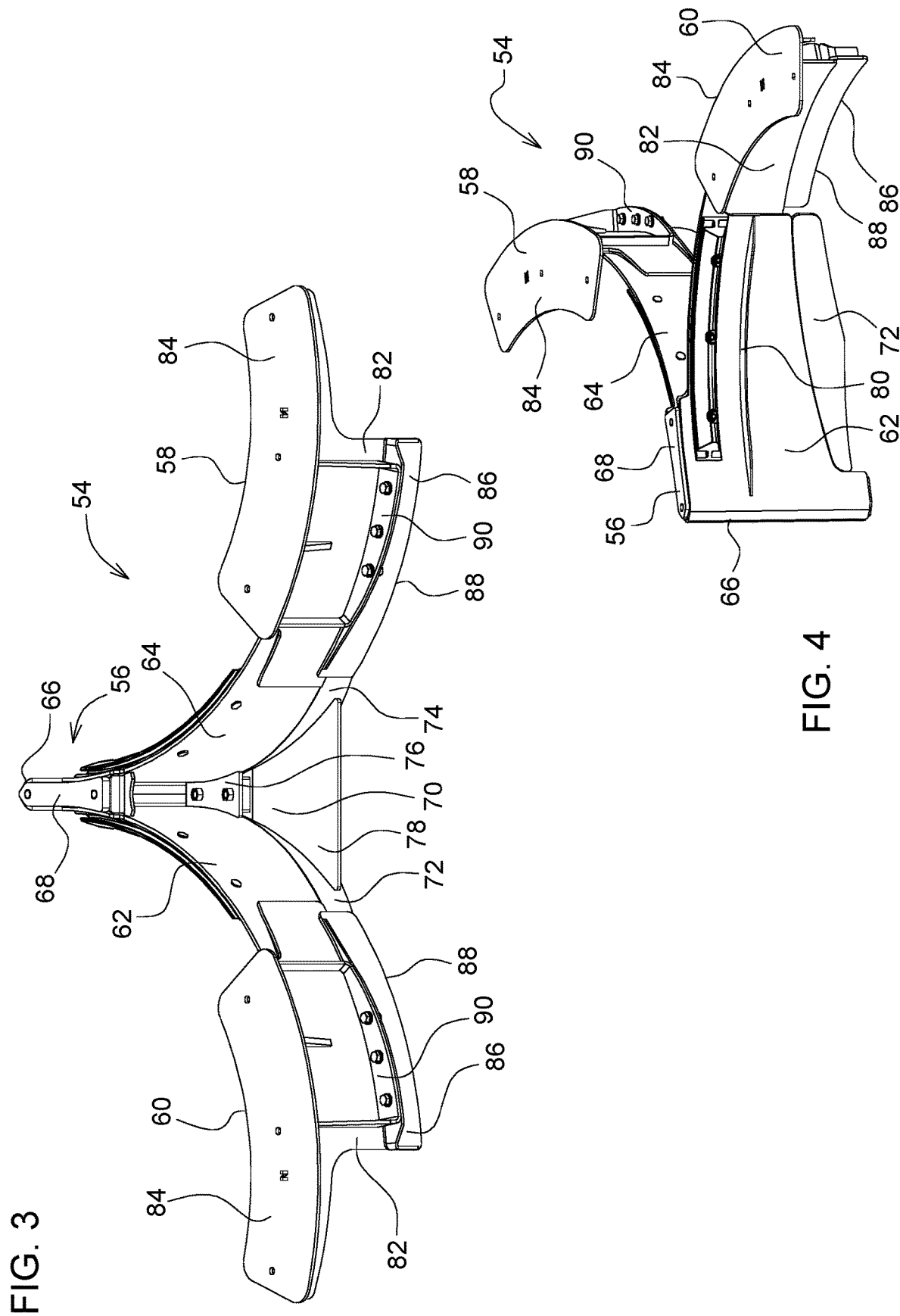

SPREADER FOR HARVESTED CROP RESIDUE

CROSS-REFERENCE TO RELATED APPLICATIONS

This claims priority to DE Application No. 102021131802.5, titled Speader For Harvested Crop Residue, filed Dec. 2, 2021, which is hereby incorporated by reference in its entirety.

TECHNICAL FIELD

The present disclosure relates generally to a spreader for harvested crop residue.

BACKGROUND

Agricultural combine harvesters are used during the harvesting of cereals in order to harvest plants cultivated on a field with a cutting tool and to thresh, separate and clean the plants in the combine harvester. The grain obtained in the threshing and separating process is cleaned in a cleaning device and deposited in a grain tank from where it is ultimately loaded onto a transport vehicle. However, the harvested crop residue (straw and potentially chaff) is chopped in a straw chopper and spread over the field.

In view of current conventional cutting tool widths which are in the order of magnitude of 10 m and more, actively driven spreaders which are arranged downstream of the straw chopper and which comprise two adjacently arranged rotating throw blowers with paddles are generally used for spreading the harvested crop residue. Guide plates are arranged between the throw blowers, said guide plates having a front tip penetrating the interstice between the throw blowers and two lateral guide elements which follow downstream and which in each case are adjacent to a throw blower and are adapted to the contour thereof (see, for example, DE 102008 040 129 A1 and U.S. Pat. No. 7,331, 855 B2).

The object is to spread the harvested crop residue as uniformly as possible over the cutting tool width. The achieved throwing width and uniformity of the spreading, however, depend on the properties of the harvested crops (in particular of the straw). Dry, relatively lightweight straw naturally has a shorter flying distance than damp straw which has a greater mass and thus is decelerated to a lesser extent by the friction in the air than the dry straw. In worst case scenarios, therefore, the spreading of the harvested crop residue is not uniform and damp straw may even pass into the crop stand which is still upright and which the combine harvester is currently travelling past.

In addition to relatively complex automatic arrangements for controlling the spreading width (see, for example, EP 3 613 272 A1 and the references cited therein) it is provided to adapt the shape, size and position of the guide elements, which are arranged between the throw blowers and therebehind, to the respective spreading arrangement (U.S. Pat. No. 7,331,855 B2). In spreading arrangements currently manufactured by the Applicant, the guide elements which are separated from the tip may be moved in the peripheral direction of the throw blowers into different positions in order to vary the spreading width, whilst EP 2 250 868 A1 proposes to assign to the throw blowers two respective guide elements (denoted therein as shields) with different dimensions in the axial and tangential direction, in each case one thereof being able to be brought into an active position. The shorter guide element is activated for spreading the straw and chaff over the entire cutting tool width, whilst the longer guide element is required in swath depositing mode in order to spread the chaff spaced apart to the side and thus separate from the swath deposited in the vicinity of the longitudinal axis of the combine harvester. In EP 1 442 651 A2 it is proposed to adjust upwardly and downwardly the upper limit of the discharge channel which is followed downstream by throw blowers rotating about a horizontal axis oriented in the forward direction, in order to adapt the maximum throwing width to the cutting tool width. Additionally, guide plates which are arranged between the throw blowers and thereunder are provided here, followed downstream by fingers with curved portions adapted to the contour of the throw blowers and linear end portions which may be unscrewed, the spacing, shape and length thereof being selectable.

SUMMARY

The present disclosure relates to a spreader for harvested crop residue which is configured to be attached downstream of a straw chopper of a combine harvester, comprising two adjacently arranged throw blowers with paddles which are able to be set in rotation about one respective axis and in opposing directions to one another, as well as a guide arrangement for predetermining the spreading characteristic of the throw blowers, said guide arrangement having a front tip penetrating the interstice between the throw blowers and two lateral guide elements which follow downstream and which in each case are adjacent to a throw blower and are adapted to the contour thereof.

Whilst an automatic adaptation of the spreading width is very complex since suitable sensors and actuators are necessary, in the previous guide plates which may be attached in different positions by hand or by means of an actuator, it is to be regarded as a drawback that whilst a simple adjustment of the position of the guide plates in the peripheral direction of the throw blowers changes the throwing width (the further outwardly the guide plate is placed, the further the harvested crops are thrown) this does not always lead to a uniform spreading of the harvested crop residue over the cutting tool width, since depending on the position of the guide plates in the peripheral direction, the outer region (spaced apart from the longitudinal central axis of the combine harvester) is potentially subjected to harvested crop residue to a greater or lesser extent, whilst the inner region is filled up to a greater extent (in the case of dry harvested crop residues) or to a lesser extent (in the case of damp harvested crop residues). This problem occurs both in throw blowers rotating about vertical axes according to U.S. Pat. No. 7,331,855 A1 and in throw blowers rotating about horizontal axes according to EP 1 442 651 A2. The arrangement according to EP 2 250 868 A1 permits an adaptation to a swath depositing mode (by depositing the chaff laterally adjacent to the straw swath) and a wide spreading mode, by rotating one of the two different guide elements into an active position. For this purpose, however, both guide elements always have to be transported, which makes the spreader relatively heavy and complex.

The object of the present disclosure is seen to provide a spreader for harvested crop residue and a combine harvester provided therewith, which are improved.

A spreader for harvested crop residue is configured to be attached downstream of a straw chopper of a combine harvester and comprises two adjacently arranged throw blowers with paddles which are able to be set in rotation about one respective axis in opposing directions to one another, as well as a guide arrangement which defines the spreading characteristic of the throw blowers and which has a front tip penetrating the interstice between the throw blowers and two lateral guide elements which follow the tip downstream (i.e. in the rotational direction of the throw blowers) and which in each case are adjacent to a throw blower and are adapted to the contour thereof. Extension means are connectable or connected to the guide arrangement for selectively extending the guide device in the axial direction of the throw blowers.

In this manner, the spreader may be adapted in a simple and rapid manner to different harvested crop conditions. In the embodiment shown hereinafter, the extension means may be installed on the guide arrangement or dismantled therefrom as required, or optionally replaced by extension means having other dimensions (measured axially and/or in the peripheral direction). In a further embodiment, not shown, the extension means may be telescopable and thus optionally extended in steps or steplessly to a greater or lesser extent in the axial direction and optionally also in the peripheral direction.

Other features and aspects will become apparent by consideration of the detailed description, claims, and accompanying drawings.

BRIEF DESCRIPTION OF THE DRAWINGS

An exemplary embodiment of the present disclosure which is described in more detail hereinafter is shown in the drawings, in which:

FIG. 3 shows a perspective view of a guide device from the rear, and

FIG. 4 shows a perspective view of the guide device from the side.

DETAILED DESCRIPTION

Figure 1:
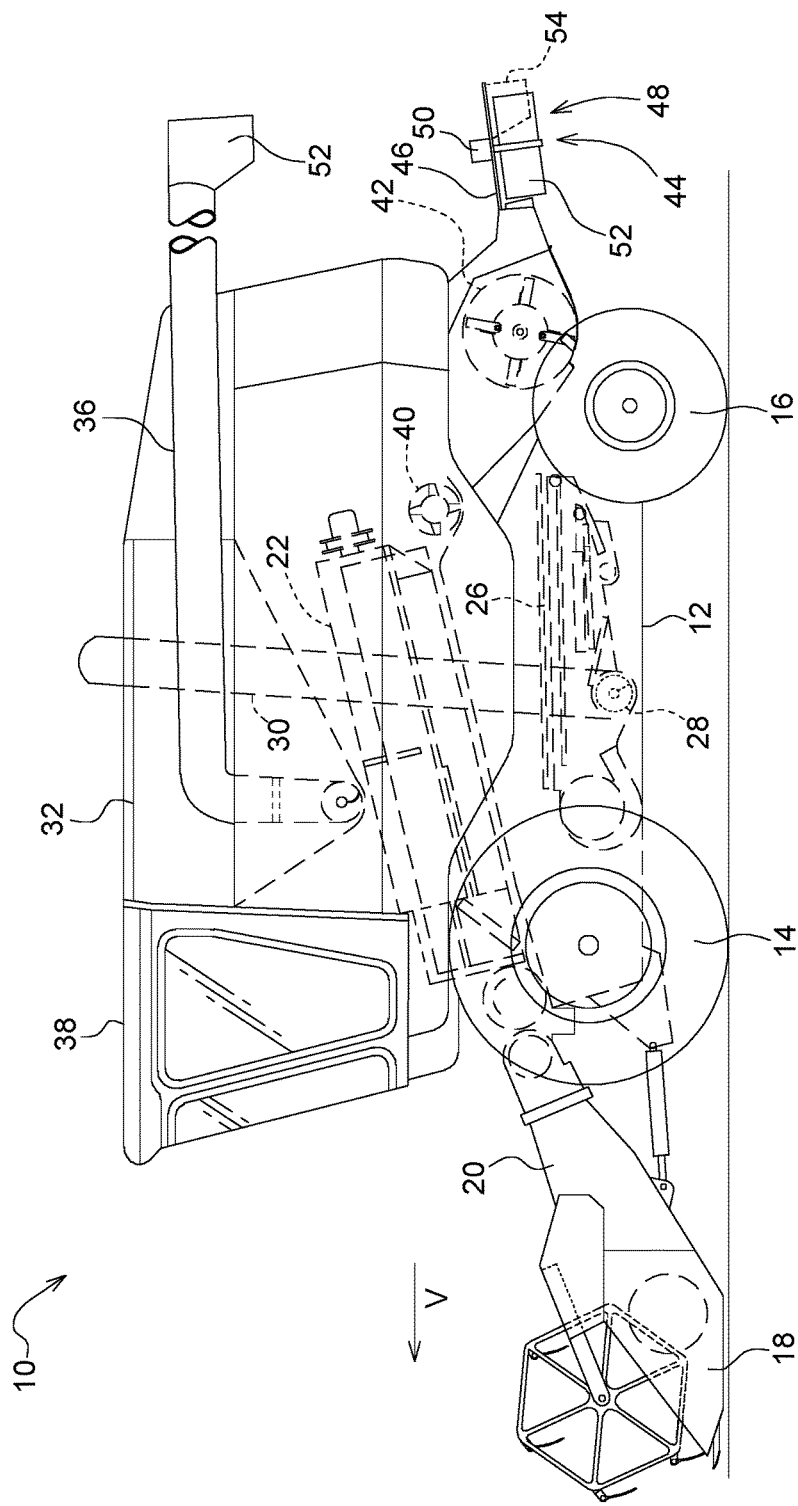
FIG. 1 shows a schematic lateral view of a combine harvester.

FIG. 1 shows a self-propelled harvesting machine in the form of a combine harvester 10 with a chassis 12 which is supported on the ground via driven front wheels 14 and steerable rear wheels 16 and is propelled forward thereby. The wheels 14, 16 are set in rotation by means of drive means, not shown, in order to move the combine harvester 10, for example, over a field to be harvested. Hereinafter directional information, such as front and rear, refer to the direction of travel V of the combine harvester 10 during harvesting mode, which runs to the left in FIG. 1.

A harvesting attachment 18 in the form of a cutting tool is removably attached to the front end region of the combine harvester 10 in order to harvest harvested crops in the form of cereals or other threshable stalk crops from the field in harvesting mode and to feed said harvested crops upwardly and to the rear through a feeder house assembly 20 to an axial threshing tool 22. The mixture containing grains and contaminants passing through threshing concaves and grids in the axial threshing tool 22 enters a cleaning device 26. Cereals cleaned by the cleaning device 26 are fed by means of a grain auger 28 to a grain elevator 30 which conveys the cereals into a grain tank 32. The cleaned cereals may be unloaded from the grain tank 32 by an unloading conveyor 36. The harvested crop residue (straw) discharged from the axial threshing tool 22 is fed to a straw chopper 42 by means of a conveying drum 40 which chops the harvested crop residue and feeds it to a spreader 44 which spreads it over the field across the width of the harvesting attachment 18. The spreader 44 may also spread the chaff which is discharged by the cleaning device 26 and which may be fed thereto from the straw chopper 42 or directly from the cleaning device 26. The aforementioned systems are driven by means of an internal combustion engine and monitored and controlled by an operator from a driver's cab 38. The axial threshing tool 22 which is shown with one or more axial threshing and separating rotors is only one exemplary embodiment and could be replaced, for example, by a tangential threshing tool with one or more threshing drums and downstream straw walkers or separating rotor(s).

Figure 2:
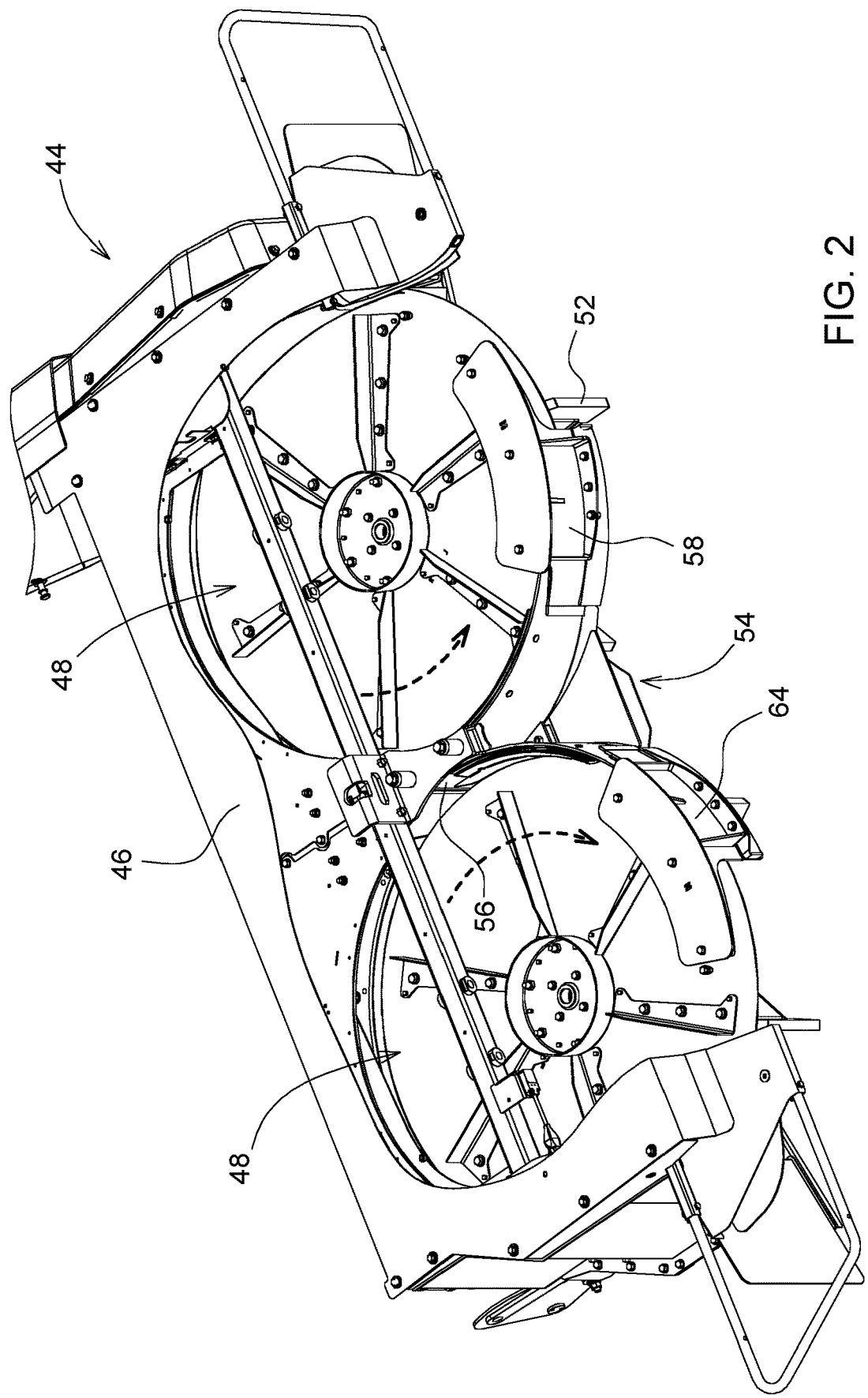
FIG. 2 shows a view of a spreader from above.

The spreader 44 comprises an upper housing 46, two laterally adjacently arranged throw blowers 48 with paddles 52 being arranged therebelow and during harvesting mode being able to be set in rotation by means of a drive 50, in the direction identified in FIG. 2 by arrows. The rotational axes of the throw blowers 48 are oriented at right-angles to the plane of the housing 46. The drive 50 may be designed as an electric or hydraulic motor or it comprises a mechanical drive train which connects the throw blowers 48 to an internal combustion engine of the combine harvester 10.

The rotational axis of the throw blowers 48 is oriented approximately vertically in FIG. 1, the spreader 44 being acted upon obliquely from the front and below. Alternatively, however, any other configuration may be used, for example with horizontal rotational axes of the throw blowers 48 and being acted upon by the straw chopper 42 from above. The straw chopper 42 could also be designed as an axial end portion of the axial threshing tool 22.

A guide arrangement 54 is arranged to the rear of the throw blowers 48 and therebetween. As shown in FIG. 2, the guide arrangement 54 comprises in a manner known per se a front tip 56 penetrating the interstice between the throw blowers 48, and two lateral guide elements 58, 60 which follow downstream and which in each case are adjacent to a throw blower 48 and are adapted to the contour thereof. The guide arrangement 54 as a whole is shown in FIGS. 3 and 4. It should also be mentioned that the tip 56 could also have a central through-passage for harvested crop residue which is then discharged directly to the rear, optionally by means of a spreading element moving to and fro.

The tip 56 comprises two curved upper walls 62, 64 (adapted to the periphery of the throw blowers 48) which converge at a leading end 66. The tip 56 is fastened to the housing 46 by an upper flange 68 with holes incorporated therein.

A first extension means 70 is removably attached below the tip 56. The first extension means 70 comprises curved lower walls 72, 74 which are located exactly below the upper walls 62, 64 and form an extension of the upper walls 62, 64 downwardly without a shoulder or projection inwardly or outwardly. The lower walls 72, 74 of the first extension means 70 are connected together by a triangular plate 78 and the triangular plate is screwed to the tip 56 by means of a flange 76. The flange 76 is located directly to the rear of the leading end 66. The first extension means 70 may alternatively be referred to as an extension 70.

By way of FIG. 4 it may be identified that outwardly protruding runners 80 are arranged on the upper walls 62 and 64 of the tip 56, said runners serving for guiding the harvested crops and running parallel to the plane of the housing 46 and in the peripheral direction of the throw blowers 48. Such runners could also be assigned to the guide elements 58, 60, in particular oriented with the runners 80 of the tip 56 relative to the axial direction of the throw blowers 48.

The separating line between the lower walls 72, 74 and the upper walls 62, 64 is inclined slightly to the rear and to the top, i.e., the upper walls 62, 64 become successively lower in the rotational direction of the throw blowers 48 with rising lower edges. The lower edges of the lower walls 72, 74, however, run horizontally approximately to the center thereof (viewed in the rotational direction of the throw blowers 48) and then obliquely upwardly as shown in FIG. 4.

The lateral guide elements 58, 60 comprise in each case an upper flange 84 which extends parallel to the plane of the housing 46 and serves for fastening the guide elements 58, 60 to the housing 46. Additionally, the lateral guide elements 58, 60 comprise upper walls 82 which are fixedly connected to the flange 84 and adjoin the upper walls 62, 64 of the tip 56 offset outwardly (in the radial direction of the throw blowers 48). The upper walls 82 also follow the periphery of the throw blowers 48.

Second and third extension means 88 with lower walls 86 are fastened to the lower faces of the lateral guide elements 58, 60 by flanges 90 protruding outwardly (away from the throw blowers 48) and screws. Similar to the lower walls 72, 74, the lower walls 86 are located below the upper walls 82 of the guide elements 58, 60 and form an extension of the upper walls 82 downwardly. The lower walls 86 are offset outwardly by the material thickness of the walls 82, 86. For spatial reasons, this offset is not provided in the lower walls 72, 74 relative to the upper walls 62, 64 of the tip 56, although it might be conceivable. In a further embodiment, the walls 82 and 86 may also be oriented exactly one below the other in the vertical direction. The second and third extension means 88 may alternatively be referred to as second and third extensions 88.

The same applies to the peripheral direction since the walls 62, 64, 72, 74, 82, 86 of the tip 56 and the guide elements 58, 60 and the extension means 88 adjacent to the throw blowers 48 are adapted to the periphery of the throw blowers 48 and also do not have any gaps or projections or shoulders inwardly or outwardly in the rotational direction thereof, apart from the fact that the walls 82, 86 of the lateral guide elements 58, 60 are offset slightly to the outside relative to the walls 62, 64, 72, 74 of the tip 56 and bear with their upstream regions against the outer faces of the walls 62, 64, 72, 74 in order to permit an adjustment of the lateral guide elements 58, 60 in the peripheral direction of the throw blowers 48. The height of the lower walls 86 of the second and third extension means 88 (i.e., the dimension thereof in the axial direction of the throw blowers 48) is constant over the length thereof, measured in the peripheral direction of the throw blowers 48.

In particular with reference to FIG. 3, it may be identified that the upper walls 82 of the lateral guide elements 58, 60 bear with their regions upstream in the peripheral direction of the throw blowers 48 against the outer faces of the upper walls 62, 64 of the tip 56, which also equally applies to the lower walls 86 of the second and third extension means 88, which also bear against the outer faces of the lower walls 72, 74 of the first extension means 70. As a result, it is possible to attach the lateral guide elements 58, 60 not only in the position on the housing 46, shown in FIGS. 3 and 4, but also in a further outwardly rotated position in order to guide the harvested crop residue further outwardly. As a result, it is possible to adapt the spreader to different harvested crop conditions (for example the humidity thereof) and to the width of the harvesting attachment 18, optionally in combination with a variation in the rotational speed of the throw blowers 48. One possibility therefor might be to unscrew the lateral guide elements 58, 60 from the housing 46 and to screw on said lateral guide elements again in a different position, optionally by using slots in the housing 46 or in the upper flanges 84. A further possibility is not to fasten the upper flange 84 directly to the housing 46 but to a turntable which is rotatable about the rotational axis of the throw blowers 48 (not shown, but see EP 2 250 868 A1) which is movable by hand or by means of an actuator actuated by external force, controlled by an operator from the cab 38 or by an automatic system with a sensor for detecting the spreading of the cut crops on the field and/or environmental conditions (see EP 3 316 272 A1 and EP 3 613 272 A1).

In contrast to that shown, the first, second and third extension means 70 and 88 could be designed in one piece. In this case, the lower walls 86 would not be adjusted with the lateral guide elements 58, 60 but would remain with the tip 56 in situ (or the lateral guide elements 58, 60 are also stationary).

However, since the spreading of the harvested crop residue in the outer regions of the spreading width depends not only on the properties of the harvested crops, in particular the humidity thereof, there is the possibility of attaching, as shown in FIGS. 3 and 4 or removing the first extension means 70 and/or one or both of the second and third extension means 88. When the extension means 70 and/or 88 are removed, a larger proportion of the harvested crop residue is deposited in the vicinity of the longitudinal central plane of the combine harvester 10 than when the extension means 70, 88 are mounted, which in particular may be expedient in the case of damp harvested crop conditions, in order to achieve a more uniform spreading of the harvested crop residue over the width of the harvesting attachment 18. There is also the possibility of mounting extension means 70 and/or 88 which have different (larger or smaller) vertical dimensions and/or dimensions measured in the peripheral direction than the extension means shown.

It follows from the above that the removable extension means 70 and 88, which extend the guide arrangement 54 to a greater or lesser extent in the axial direction of the throw blowers 48, provide a possibility for improving or optimizing the spreading of the harvested crop residue which is easy to mount, simple and cost-effective, in the sense of achieving a uniform spreading over the width of the harvesting attachment 18.

What is claimed is:

1. A spreader for harvested crop residue which is configured to be attached downstream of a straw chopper of a combine harvester, comprising two adjacently arranged throw blowers with paddles which are able to be set in rotation about one respective axis and in opposing directions to one another, and a guide arrangement for predetermining the spreading characteristic of the throw blowers, said guide arrangement having a tip penetrating the interstice between the throw blowers and two lateral guide elements which follow downstream and which in each case are adjacent to a throw blower and are adapted to the contour thereof, and an extension being releasably connectable or connected to each of the lateral guide elements, for selectively extending the lateral guide element in an axial direction of the throw blowers.

2. The spreader according to claim 1, wherein a housing is attached to one side of the throw blowers and the extensions are attached or attachable to the side of the guide arrangement spaced apart from the housing.

3. The spreader according to claim 1, wherein the tip and the lateral guide elements are assigned a common extension or separate extensions.

4. The spreader according to claim 1, wherein the lateral guide elements are able to be attached at different positions relative to the tip in the peripheral direction of the throw blowers.

5. The spreader according to claim 4, wherein upstream regions of the lateral guide elements bear against the outer faces of the tip remote from the throw blowers.

6. The spreader according to claim 4, wherein upstream regions of the extensions of the lateral guide elements bear against the outer faces of the extension of the tip remote from the throw blowers.

7. The spreader according to claim 1, wherein the guide elements and the extensions are provided on the side spaced apart from the throw blower with flanges which are oriented radially to the throw blowers, the extensions being connected thereby to the guide elements.

8. The spreader according to claim 1, wherein the surfaces of the extensions facing the throw blowers form a generally gap-free extension of the guide elements in the axial direction and peripheral direction of the throw blowers, without a substantial shoulder or projection inwardly or outwardly.

9. The spreader according to claim 1, wherein outwardly protruding runners which extend in the peripheral direction of the throw blowers are arranged on the tip for guiding harvested crops.

10. A combine harvester with a straw chopper and the spreader according to claim 1, wherein the spreader is arranged downstream of the straw chopper.

11. The spreader according to claim 2, wherein the tip and the lateral guide elements are assigned a common extension or separate extensions.

12. The spreader according to claim 2, wherein the lateral guide elements are able to be attached at different positions relative to the tip in the peripheral direction of the throw blowers.

13. The spreader according to claim 3, wherein the lateral guide elements are able to be attached at different positions relative to the tip in the peripheral direction of the throw blowers.

14. The spreader according to claim 5, wherein upstream regions of the extensions of the lateral guide elements bear against the outer faces of the extension of the tip remote from the throw blowers.

* * * * *